(12) United States Patent
Thiessen et al.

(10) Patent No.: US 10,264,801 B1
(45) Date of Patent: Apr. 23, 2019

(54) SHELLFISH GAUGE AND CLEANER

(71) Applicants: Anthony S. Thiessen, Dallas, OR (US); Eugene E. Calkins, Salem, OR (US)

(72) Inventors: Anthony S. Thiessen, Dallas, OR (US); Eugene E. Calkins, Salem, OR (US)

( * ) Notice: Subject to any disclaimer, the term of this patent is extended or adjusted under 35 U.S.C. 154(b) by 0 days.

(21) Appl. No.: 16/163,469

(22) Filed: Oct. 17, 2018

(51) Int. Cl.
*A22C 29/00* (2006.01)
*A22C 29/02* (2006.01)

(52) U.S. Cl.
CPC .......... *A22C 29/021* (2013.01); *A22C 29/005* (2013.01)

(58) Field of Classification Search
CPC ....... A22C 29/00; A22C 29/005; A22C 29/02; A22C 29/021; A22C 29/024; A22C 29/025; A22C 29/027
USPC ......................................... 452/1–6, 102–105
See application file for complete search history.

(56) References Cited

U.S. PATENT DOCUMENTS

| D224,440 | S | * | 7/1972 | dAughty | D10/62 |
| 4,802,260 | A | * | 2/1989 | Fletcher | A47G 21/061 |
| | | | | | 452/1 |
| 5,830,049 | A | * | 11/1998 | Haley | A22C 29/024 |
| | | | | | 452/6 |
| 7,033,006 | B2 | * | 4/2006 | Ebisawa | B41J 2/17509 |
| | | | | | 347/85 |
| 7,547,246 | B1 | * | 6/2009 | Verret | A22C 29/024 |
| | | | | | 452/6 |
| 9,380,793 | B2 | * | 7/2016 | Wielockx | A22C 13/0013 |
| 9,888,698 | B1 | * | 2/2018 | Morsell | A22C 29/027 |

OTHER PUBLICATIONS

Crab Gauge Aug. 18, 2010 (Year: 2010).*

* cited by examiner

*Primary Examiner* — Richard T Price, Jr.
(74) *Attorney, Agent, or Firm* — Carl D. Crowell

(57) ABSTRACT

A crab gauge and cleaning tool with a base and a blade having an arched upper edge and a lower edge, a coupling for removably attaching the blade to the base such that when attached the blade extends upwardly from the base in a central area of the top surface and a blade storage for securing the blade to the base, and wherein the blade has a first mounting foot and a second mounting foot with the space between the mounting feet defining a measuring distance for measuring shellfish.

15 Claims, 5 Drawing Sheets

SHELLFISH GAUGE AND CLEANER

BACKGROUND OF THE INVENTION

1. Field of the Invention

The present invention relates to shellfish measuring and cleaning tools and more particularly pertains to a new tool for efficient measuring, cracking and cleaning of shellfish such as crabs.

2. Description of the Prior Art

The field of shellfish measuring and cleaning tools is crowded with countless creative solutions to the numerous problems shellfish fishermen have encountered. In the fishing for crab a common problem relates to size limitations on catch that may be maintained and requires a quick and ready means to confirm a crab is neither too large nor too small. For instance, in some places legal Dungeness crab must be at least 5¾-inches across the back, not including the spines. In other places the measurements may require the crab be 6¼-inches or some other interval. This problem is generally resolved with a gauge that is kept on hand that has one or more notches within an open span. If the shell of the crab fits within a specific notch then it can be returned to the ocean to comply with legal limits.

Another problem crab fishermen deal with is the cleaning of crab. Crab cleaning generally involves the cracking of the carapace and removal of internal organs, viscera, guts, and crab butter and separation of the portions of the crab that contain the desirable edible meat which is located in the perimeter of the body and legs. Crab cleaning may be performed before or after cooking, but often people prefer to clean a crab prior to cooking as many toxins such as domoic acid build up in the internal organs and migrate to the edible meat during cooking. Cooking a cleaned crab reduces the risk of exposure to such toxins.

Illustrative of the prior art includes U.S. Pat. No. D.224,440 to Daughtry that depicts a typical measuring gauge with an interior span for receiving a crab carapace to be measured. Multiple notches are depicted to permit the gauge to be used for differing species and locale. The Daughtry gauge is a useful measuring tool, but fails to provide any assistance in the cleaning of crabs.

Other prior art includes U.S. Pat. No. 5,830,049 to Haley et al. which provides for a curved knife tool that is used to remove the legs of a crab and a portion of the internal meat of the crab proximate the legs, but leaves the central body of the crab intact. The Haley blade must be specifically placed on each side of a crab to be cleaned and then impacted with a second tool, such as a hammer to chop through the abdomen and carapace severing the legs. The process must then be repeated on the other side. The result is a residual 'core' of the body of the crab and residual body meat and residual viscera in the portion of the body removed with the legs. Such a means of fully splitting a crab increases in detritus and mess as more shell is cracked and splintered and the viscera are disbursed with the added force needed to crack the carapace portion of the body.

The prior art of U.S. Pat. No. 7,547,246 to Varret comprises a chopping blade for dismembering a crab into multiple pieces by cracking through the carapace and entire body of a crab and is designed for use on a fully cooked crab. As with Haley this means of cleaning a crab increases detritus and mess as more shell is cracked and splintered and the viscera are disbursed with the added force needed to crack the carapace portion of the body.

The prior art of U.S. Pat. No. 9,380,796 to Quisenberry comprises a cracking tool with a wedge but fails to provide for any means to measure or determine if the crab is of legal size. Further, the Quisenberry tool provides for a straight wedge which is adapted to be used for cracking the carapace and entire body of a crab and is designed to function best when the crab is impacted on the blade carapace first. As with Haley this means of cleaning a crab increases detritus and mess as more shell is cracked and splintered and the viscera are disbursed with the added force needed to crack the heavy carapace portion of the body.

The prior art of U.S. Pat. No. 7,022,006 to Naglich et al. comprises a cracking tool with a removable blade for storage, but fails to provide for any means to measure or determine if the crab is of legal size. Further, the Naglich tool provides for a straight blade which like the Quisenberry patent is adapted to be used for cracking the carapace and entire body of a crab and functions best when the crab is impacted on the blade carapace first. As with Haley this means of cleaning a crab increases detritus and mess as more shell is cracked and splintered.

Generally the technology has focused on either a means of measuring a crab or a means of completely dismembering a crab into multiple portions and splitting the entire body and upper carapace, increasing detritus and shell fragments and often resulting in a loss of edible meat.

While these devices fulfill particular objectives and requirements, the need remains for a tool that easily and efficiently measures and cleanly cracks crab while also having the ability be easily disassembled for cleaning and storage.

SUMMARY OF THE INVENTION

The present invention meets the needs presented above by incorporating a measuring blade and cleaning member which is easily removed from its base.

Another object of the present invention is to provide a new shellfish measuring and cleaning tool that has a base that includes a retaining means for removably receiving the measuring blade for storage of the blade with the base.

Still another object of the present invention is to provide a new shellfish measuring and cleaning tool that includes a water buoyant base and float so that the base and or blade will float should it fall off of a boat or pier and into the water.

Still another object of the present invention is to provide a new shellfish measuring and cleaning tool that includes a blade with an arched upper edge to facilitate the cracking of the abdomen of the crab, yet leave the carapace intact.

Still another object of the present invention is to provide a new shellfish measuring and cleaning tool that provides for a more hygienic means of cleaning crabs and avoiding contamination or disbursal of crab viscera.

Still another object of the present invention is to provide a new shellfish measuring and cleaning tool that allows a crab to be cleaned quickly, safely, and when cleaned live, humanely.

To this end, the present invention generally comprises a base having a top surface, a bottom surface, a pair of end edges and a pair of side edges. A blade with an upper arched edge is supplied which may be used for cracking shellfish upon. A pair of notch receivers are located on the end edges for selectively attaching the measuring blade to the base such that the measuring blade extends upwardly from the base when used to clean crabs. When not in use to clean crabs the blade may be removed from the base and used to measure shellfish.

There has thus been outlined, rather broadly, the more important features of the invention in order that the detailed description thereof that follows may be better understood, and in order that the present contribution to the art may be better appreciated.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
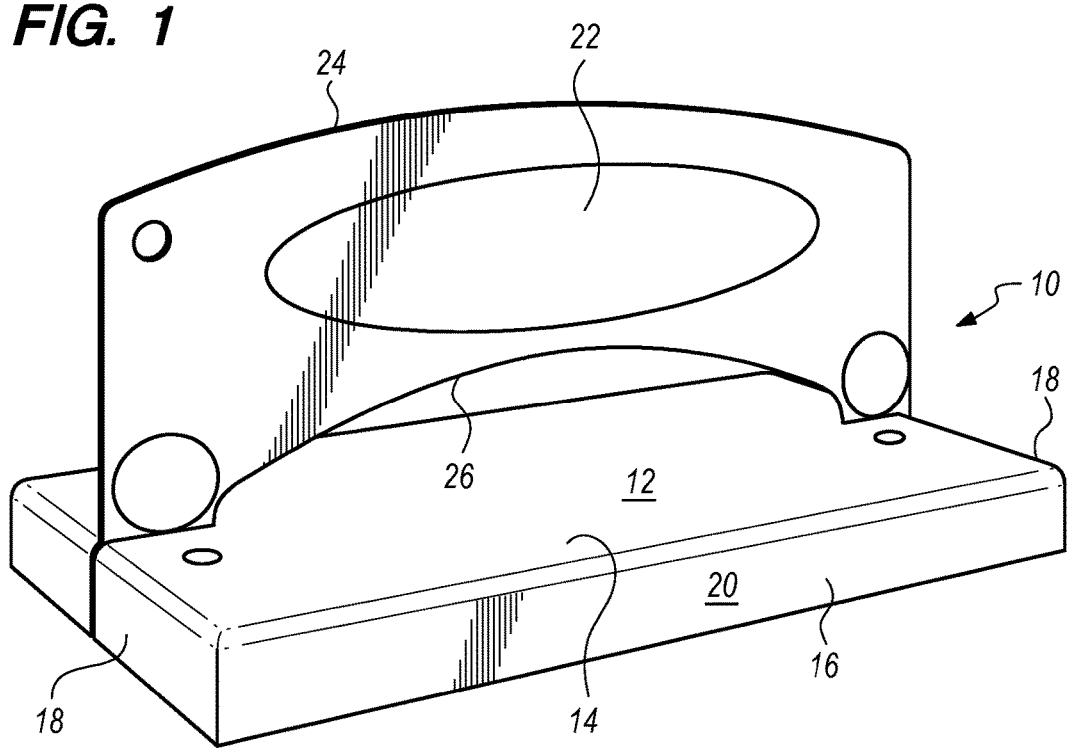
FIG. 1 is a perspective view of shellfish measuring and cleaning tool according to the present invention.

With reference now to the drawings, FIGS. 1 through 7, a new shellfish measuring and cleaning tool embodying the principles and concepts of the present invention and generally designated by the reference numeral 10 will be described.

As best illustrated in FIGS. 1 through 7, the crab cleaning tool 10 generally comprises a base 12 having a top surface 14, a bottom surface 16, a pair of end edges 18 and a pair of side edges 20. The top 14 and bottom 16 surface each preferably has a generally rectangular shape. For stability, each of the end edges 18 has a length generally between 5 inches and 10 inches and each of the side edges 20 has a length generally between 3 inches and 7 inches. Depending on the species of crab to be cleaned, larger or smaller sizes may be preferred. At times a base of a size to receive multiple blades may be desirable. The base 12 ideally comprises a solid easily cleaned material such as food grade plastic or wood, which may be buoyant.

Figure 2:
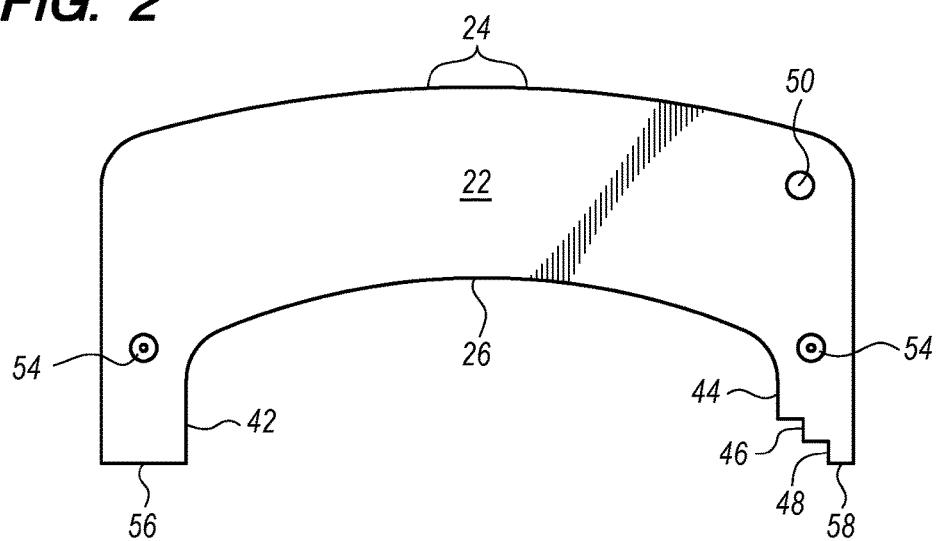
FIG. 2 is a front plan view of the measuring blade removed from the base.
Figure 3:
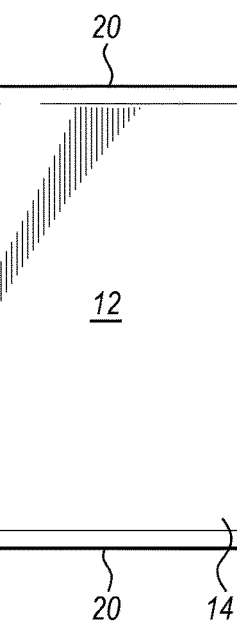
FIG. 3 is a top plan view of the mounting base.

As shown in FIG. 1, a blade 22, seen mounted and separately depicted in FIG. 2, includes an upper edge 24 and a lower edge 26. The blade 22 is preferably comprised of a semi-rigid metal material such as stainless steel, but suitable plastics and other materials may also be used as long as the material is of sufficient strength to penetrate the body of a crab. In the preferred embodiment the upper edge 24 is arched to approximate the curvature of a crab carapace. Disposed on each end is a first mounting foot 56 and a second mounting foot 58. The first mounting foot includes an inner edge 42, with the lower edge 26 traversing the span to the second mounting foot 58. Located on at least one mounting foot, and preferably on the second mounting foot 58 are one or more notches, 44, 46, 48, each with a distinct inner edge, such that the distance between the inner edge 42 of the first mounting foot 56 and the first notch 44 on the second mounting foot 58 would be a set measuring distance. For the use of a tool with Dungeness crab the measurements might be 5¾ inches between the inner edge 42 of the first mounting foot 56 and the first notch 44 on the second mounting foot 58. The distance between the inner edge 42 of the first mounting foot 56 and the second notch 46 might then be 6 inches, and the distance between the inner edge 42 of the first mounting foot 56 and a third notch 48 might then be 6¼ inches. In the instance of a tool that might be used for the smaller blue crab or red crab, different or additional notices may be added to either or both of the mounting feet 56, 58, to provide for measurements of 4½ inches, 5, and 5¼ inches. The distances provided herein being preferred embodiment exemplars only, with any useful distance being possible.

A coupling means such as securing pins 54 are provided so that when the cleaning tool 10 is not needed, the blade 22 may be secured with the base 12 in a co-planar manner. In the preferred embodiment the securing pins 54 are plastic ribbed rivets with a diameter slightly larger than receiving holes 34 on the base 12 and held in place with light friction. Latches, clips, and other retaining means and even a drawer may also be used to secure the blade 22 to or within the base 12.

Figure 7:
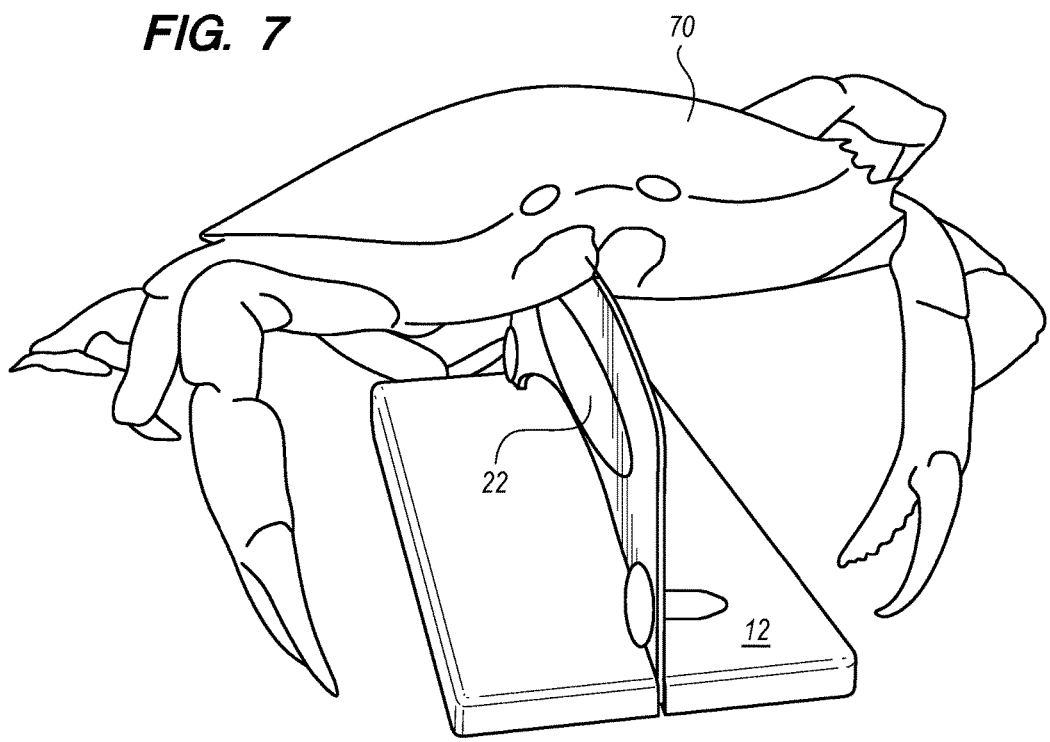
FIG. 7 is a perspective view of shellfish measuring and cleaning tool according to the present invention demonstrating use.

When use for cleaning crab is needed, the blade 22 is separated from the base 12 and then mounted perpendicular to the base as shown in FIGS. 1 and 7. In the preferred embodiment mounting is though the use of base notch cuts 32 on each base end edge 18. If the base notch cuts 32 are of the correct width the blade 22 may be secured in place by friction. In the preferred embodiment one or more of the base notch cuts 32 are 1 to 4 decrees off perpendicular to the end edges and non-parallel to each other such that when the first mounting foot 56 is placed in a base notch cut 32, it must be slightly bent or tensioned to allow the second mounting foot 58 to be received by the distal base notch cut 32. In this manner the blade 22 may be held in place by both basic friction between the mounting feet 56, 58 and the base notch cuts 32 and also through the added tension of a light bend in the blade to conform to the non-parallel base notch cuts 32.

Figure 4:
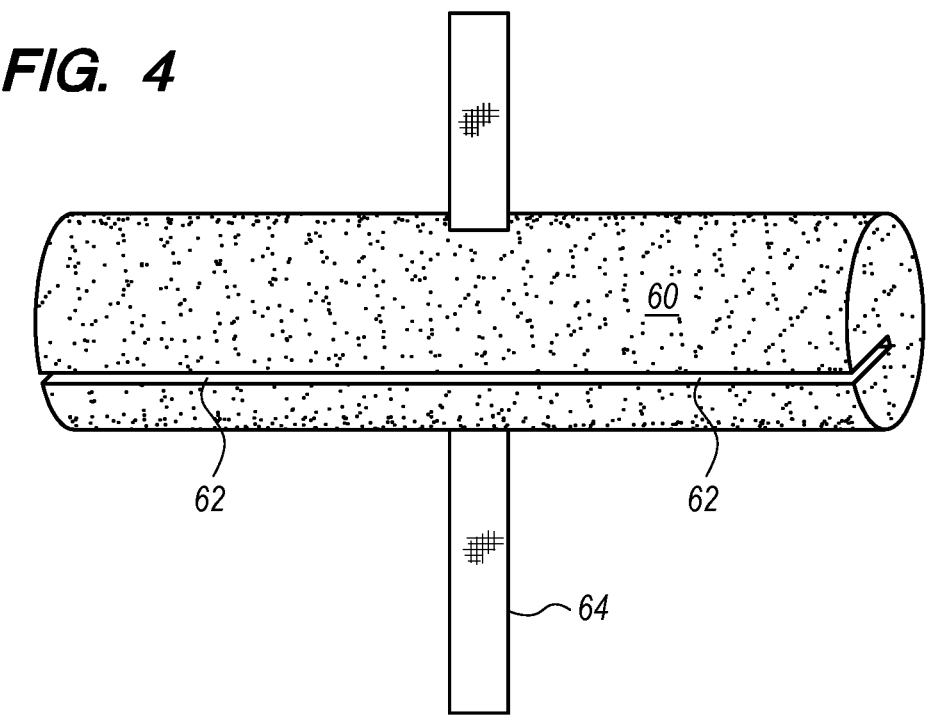
FIG. 4 is a view of the float attachment for the blade.
Figure 5:
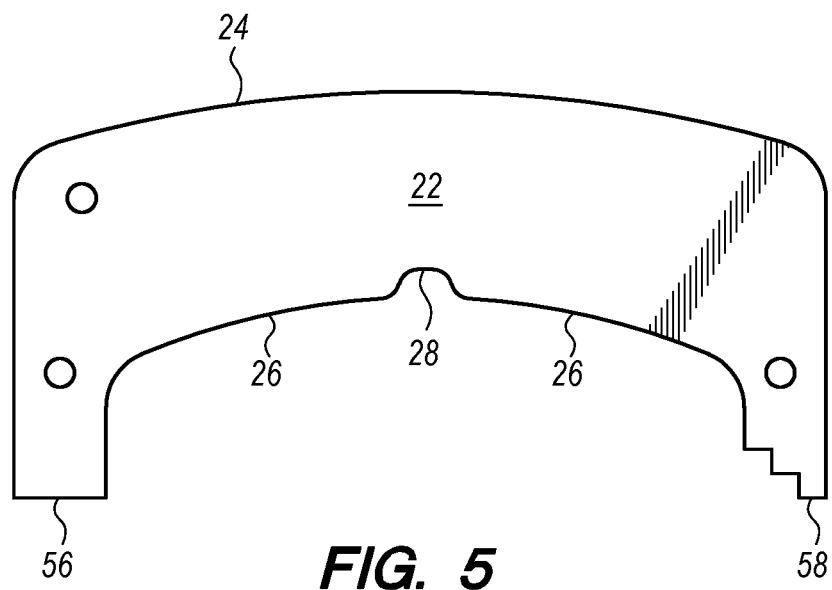
FIG. 5. is a view of a blade unit.
Figure 6:
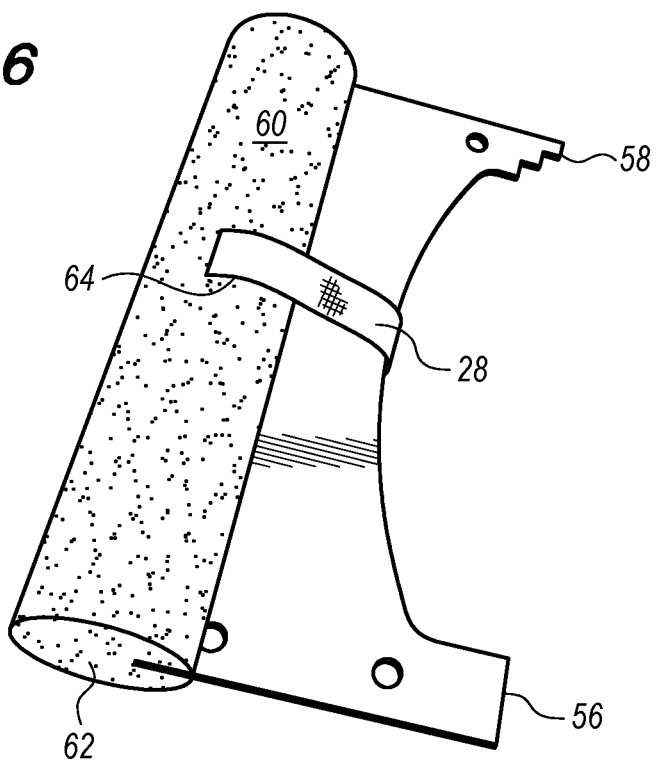
FIG. 6 is a perspective view of a blade with float attached.

In an alternate embodiment, as shown in FIGS. 4-6, the blade 22 is provided with a float notch 28 disposed on the lower edge as shown in FIG. 5. When the blade 22 is used for measuring, a float 60 with a float strap 64 may be attached to the blade 22. The float 60 may be made of a material such as buoyant polyethylene foam, or other suitable buoyant material. To secure the float 60 to the blade 22, preferably the float 60 includes a blade slot 62 for receiving the upper edge 24 of the blade 22. Many buoyant materials, including the preferred polyethylene foam can be held in place by friction, however in the preferred embedment a float strap 64 made of a material such as Velcro™ type hook and loop material is provided to wrap around the blade 22 through a float notch 28 to further removably secure the float 60 to the blade 22 as shown in FIG. 6.

In another alternate embodiment, the base 12 is of a size that it may receive multiple blades 22, including the incorporation of a base into a table top, counter or side rail of a boat such that the base 12 becomes a fixture with one or more removable blades.

In use as a measuring tool or gauge, the blade 22 is removed from the base 12 and a crab to be measured is placed within the span crated by the lower blade edge 26, with one portion of the carapace or shell against the inner edge of the first mounting foot 56 and then set within the span between the first and second mounting feet, 56, 58. Should the crab fully fit within a particular notch 44, 46, 48, then it is readily evident that the crab is less than a particular size and may be returned to comply with regulations.

In use as a cleaning tool, the blade 22 is mounted on the base 12 with the insertion of the mounting feet 56, 58 into the base notch cuts 32 such that the blade 22 is largely perpendicular to the base 12, and the float 60, if in use, is removed. As shown in FIG. 7, for optimal use, a crab 70 to be cleaned is held by the legs so that the back carapace is up and the lower abdomen of the crab is directed toward the arched upper edge 26 of the blade 22. The crab is then brought down in a quick motion on the arched upper edge 26 so that the crab is split from the lower abdomen up through to the crab carapace and cracked open permitting the carapace to be easily removed intact and the lower body of the crab separated into two pieces. Other options for use include placing the crab medially on the arched upper edge 26 of the blade 22 as depicted in FIG. 7 and then firmly slapping the top of the crab carapace with an open hand or a tool to crack the lower abdomen and then remove the legs with the body meat attached. With proper use, once the lower abdomen of a crab 70 has been split by the blade 22, the legs on each side of the crab may be grasped and pulled away with a slight twist, leaving the majority of the viscera behind with the intact carapace, and the bulk of the body meat still attached to the legs.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as formally claimed below.

The invention claimed is:

1. A tool for measuring and cleaning shellfish, said tool comprising:
   a base having a top surface, a bottom surface, a pair of end edges and a pair of side edges, said base having a means for removably mounting at least one blade;
   said removable blade comprising an arched upper edge and a lower edge, wherein a crab may be cracked upon said arched upper edge; said lower edge comprising two mounting feet defining a measuring distance between them permitting shellfish to be measured within.

2. The tool of claim 1, wherein said base includes a blade storage means of securing said blade with said base.

3. The tool of claim 1, wherein said base is comprised of a water buoyant material.

4. The tool of claim 1, wherein said top and bottom surface each having a generally rectangular shape, each of said end edges having a length generally between 5 inches and 10 inches, each of said edges having a length generally between 3 inches and 7 inches.

5. The tool of claim 1 further comprising a float that may be removably mounted to said blade.

6. The tool of claim 1 wherein at least one of said mounting feet of said blade contains at least one notch to provide a distinct additional measuring distance between said notch and a distal said mounting foot.

7. The tool of claim 1 wherein the removably mounting means of said blade comprises a pair of non-parallel base notch cuts, causing deflection or a bend in said blade when each of said mounting feet are inserted into said non-parallel base notch cuts.

8. A tool for measuring and cleaning crabs, comprising:
   a base having a top surface, a bottom surface, a pair of end edges and a pair of side edges, said base having a means for removably mounting at least one blade;
   said removable blade comprising an arched upper edge and a lower edge, wherein a crab may be cracked upon said arched upper edge; said lower edge comprising two mounting feet defining a measuring distance between them permitting shellfish to be measured within; and
   wherein at least one of said mounting feet of said blade contains at least one notch to provide a distinct additional measuring distance.

9. The tool of claim 8, wherein said base includes a blade storage means of securing said blade with said base.

10. The tool of claim 8, wherein said base is comprised of a water buoyant material.

11. The tool of claim 8 further comprising a float that may be removably mounted to said blade.

12. The tool of claim 8, wherein said top and bottom surface each having a generally rectangular shape, each of said end edges having a length generally between 5 inches and 10 inches, each of said edges having a length generally between 3 inches and 7 inches.

13. The tool of claim 8 wherein said removably mounting means of said blade comprises a pair of non-parallel base notch cuts, causing deflection or a bend when said mounting feet are inserted into said non-parallel base notch cuts.

14. A tool for measuring and cleaning shellfish, said tool comprising:
   a base having a top surface, a bottom surface, a pair of end edges and a pair of side edges, said base having a means for removably mounting at least one blade;
   said removable blade comprising an arched upper edge and a lower edge, wherein a crab may be cracked upon said arched upper edge; said lower edge comprising two mounting feet defining a measuring distance between them permitting shellfish to be measured within;
   wherein at least one of said mounting feet of said blade unit contains at least one notch to provide a distinct additional measuring distance; and
   a float that may be removably mounted to said blade.

15. The tool of claim 10 wherein said removably mounting means of said blade comprises a pair of non-parallel base notch cuts, causing deflection or a bend when said mounting feet are inserted into said non-parallel base notch cuts.

* * * * *